(12) United States Patent
Pires et al.

(10) Patent No.: US 11,962,985 B2
(45) Date of Patent: *Apr. 16, 2024

(54) INTERRUPT BASED PAIRING FOR WIRELESS AUDIO DEVICES

(71) Applicant: Hewlett-Packard Development Company, L.P., Spring, TX (US)

(72) Inventors: Victoria Pires, Mountain View, CA (US); Hua Zhao, Suzhou (CN); Yu Zhang, Suzhou (CN)

(73) Assignee: Hewlett-Packard Development Company, L.P, Spring, TX (US)

( * ) Notice: Subject to any disclaimer, the term of this patent is extended or adjusted under 35 U.S.C. 154(b) by 170 days.

This patent is subject to a terminal disclaimer.

(21) Appl. No.: 17/119,966

(22) Filed: Dec. 11, 2020

(65) Prior Publication Data
US 2021/0099802 A1 Apr. 1, 2021

Related U.S. Application Data

(63) Continuation of application No. 16/545,634, filed on Aug. 20, 2019, now Pat. No. 10,904,668.

(51) Int. Cl.
| | | |
|---|---|---|
| H04R 5/04 | (2006.01) | |
| H04R 1/10 | (2006.01) | |
| H04R 5/033 | (2006.01) | |
| H04W 76/18 | (2018.01) | |
| H04W 76/19 | (2018.01) | |

(52) U.S. Cl.
CPC ............ *H04R 5/04* (2013.01); *H04R 1/1091* (2013.01); *H04R 5/033* (2013.01); *H04W 76/18* (2018.02); *H04W 76/19* (2018.02); *H04R 2420/07* (2013.01)

(58) Field of Classification Search
CPC ........ H04R 5/04; H04R 1/1091; H04R 5/033; H04R 2420/07; H04R 1/1025; H04R 2201/107; H04R 1/1041; H04W 76/18; H04W 76/19; H04W 84/18
USPC ........................................................ 455/41.1
See application file for complete search history.

(56) References Cited

U.S. PATENT DOCUMENTS

| | | | |
|---|---|---|---|
| 10,904,668 B1 * | 1/2021 | Pires .................... | H04R 1/1025 |
| 2009/0139325 A1 * | 6/2009 | Cunningham ........... | G01D 5/24 |
| | | | 73/304 C |
| 2013/0082919 A1 * | 4/2013 | Jano .................... | H04M 1/0247 |
| | | | 345/156 |

(Continued)

OTHER PUBLICATIONS

Unknown, "LISDW12, MEMS digital output motion sensor: high-performance ultra-low-power 3-axis "femto" accelerometer," Apr. 1, 2017, pp. 1-63 (63 pages), found at URL https://www.st.com/resource/en/datasheet/lis2dw12.pdf.

(Continued)

*Primary Examiner* — Eugene Yun
(74) *Attorney, Agent, or Firm* — Quarles & Brady LLP

(57) ABSTRACT

A method for interrupt based pairing for wireless audio devices includes determining a colocation of a wireless audio device with a subsequent wireless audio device with one or more sensors. An interrupt is generated in response to determining the colocation. A pairing mode of the wireless audio device is enabled in response to the interrupt. The wireless audio device is paired with the subsequent wireless audio device.

20 Claims, 10 Drawing Sheets

(56) References Cited

U.S. PATENT DOCUMENTS

| | | | |
|---|---|---|---|
| 2014/0306553 A1* | 10/2014 | Lee ....................... | G06F 1/3278 |
| | | | 307/326 |
| 2018/0299970 A1* | 10/2018 | Kam ..................... | G06F 3/0484 |
| 2018/0307253 A1 | 10/2018 | Weiler et al. | |
| 2019/0151737 A1* | 5/2019 | Nojima .............. | G09B 19/0038 |
| 2020/0012271 A1* | 1/2020 | Jeon ..................... | G06F 1/1698 |
| 2020/0026365 A1* | 1/2020 | Rivolta ................ | G06F 1/1694 |

OTHER PUBLICATIONS

Unknown, "Hall ICs Omnipolar Detection Hall ICs," Dec. 1, 2011, pp. 1-31 (32 pages), found at URL http://www1.futureelectronics.com/doc/ROHM%20SEMICONDUCTOR/BU52025G.pdf.

* cited by examiner

INTERRUPT BASED PAIRING FOR WIRELESS AUDIO DEVICES

CROSS REFERENCE TO RELATED APPLICATIONS

This application is a continuation of U.S. patent application Ser. No. 16/545,634, filed on Aug. 20, 2019, which is hereby incorporated by reference herein.

BACKGROUND

True wireless stereo (TWS) earbuds are wireless audio devices that are paired with each other in order to share data and provide audio to a user. In other words, TWS earbuds are separate audio devices that are not physically connected to each other or to the computing device providing the audio signal. TWS earbuds are small devices. Thus, one of the earbuds may be lost. Further, because earbuds are small devices, activating buttons and switches in a reliable manner may be difficult. A challenge is to pair TWS earbuds without activating buttons and switches of the earbuds.

SUMMARY

In general, in one aspect, one or more embodiments relate to a wireless audio device that comprises a Hall sensor, a processor, and a memory. The memory comprises instructions that execute on the processor and are configured for interrupt based pairing for wireless audio devices. A colocation of the wireless audio device with a subsequent wireless audio device is determined in response to a signal from the Hall sensor. An interrupt is generated in response to determining the colocation. A pairing mode of the wireless audio device is enabled in response to the interrupt. The wireless audio device is paired with the subsequent wireless audio device.

In general, in one aspect, one or more embodiments relate to a system comprising a wireless audio device that includes an acceleration sensor. The system also includes a subsequent wireless audio device. The wireless audio device includes a processor and memory. The memory comprises instructions that execute on the processor and are configured for interrupt based pairing for wireless audio devices. A colocation of the wireless audio device with the subsequent wireless audio device is determined in response to the signal from the acceleration sensor. An interrupt is generated in response to determining the colocation. A pairing mode of the wireless audio device is enabled in response to the interrupt. The wireless audio device is paired with the subsequent wireless audio device.

In general, in one aspect, one or more embodiments relate to a method for interrupt based pairing for wireless audio devices. A colocation of a wireless audio device with a subsequent wireless audio device is determined with one or more sensors. An interrupt is generated in response to determining the colocation. A pairing mode of the wireless audio device is enabled in response to the interrupt. The wireless audio device is paired with the subsequent wireless audio device.

Other aspects of the invention will be apparent from the following description and the appended claims.

DETAILED DESCRIPTION

Figure 1A:
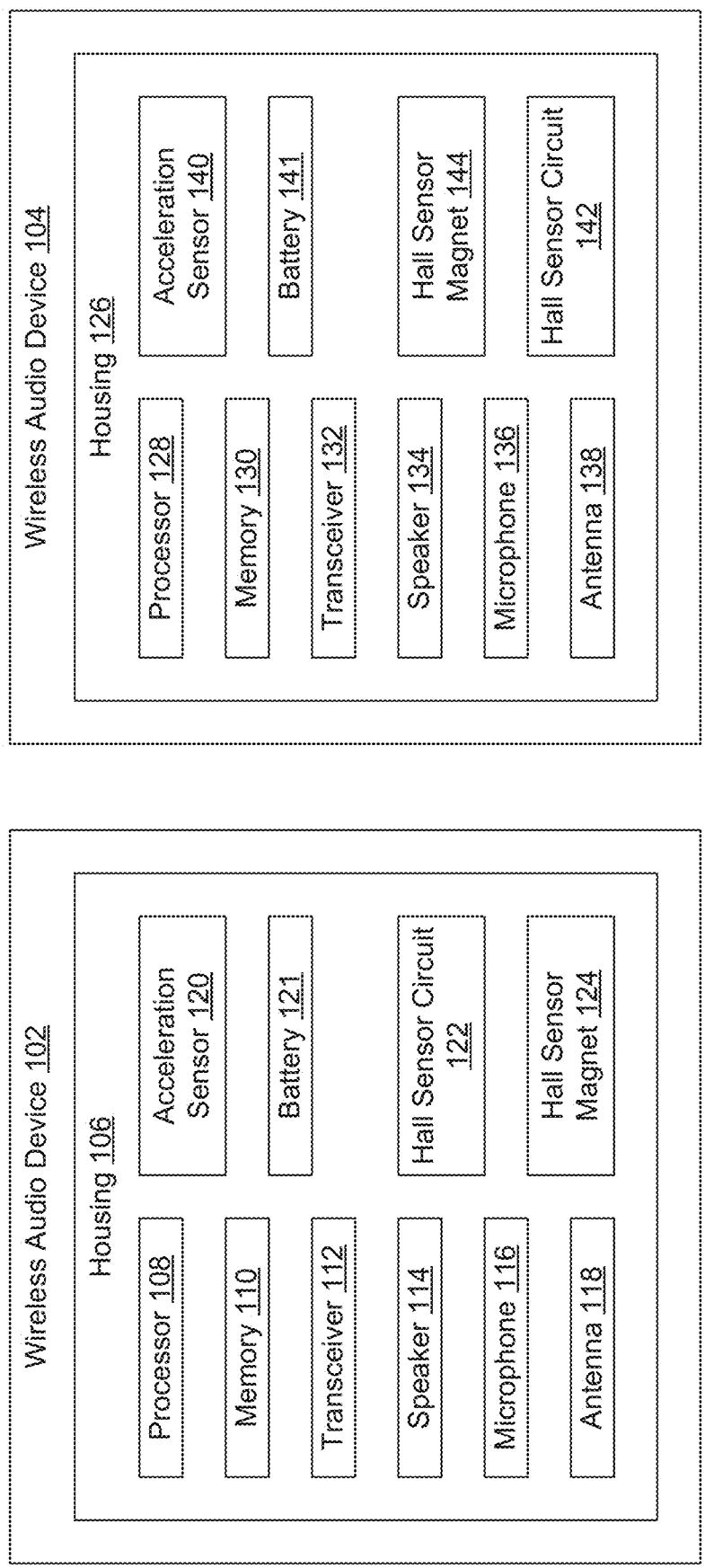
FIGS. 1A, 1B, and 1C show diagrams of a system in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include wireless audio devices, such as earbud headphones, that are paired without the use of buttons or switches. The pairing process may be initiated when the wireless audio devices are brought within a threshold distance (e.g., brought within 1 millimeter of each other) and may be initiated when the wireless audio devices are tapped a threshold number of times during a threshold length of time (e.g., tapped 3 times within 2 seconds).

In one or more embodiments, each wireless audio device includes a Hall effect sensor (referred to as a Hall sensor) and a Hall sensor magnet that are positioned within the wireless audio devices. The Hall sensor and the Hall sensor magnet are positioned so that when two devices are brought within the threshold distance, the Hall sensor magnet of one wireless audio device triggers the Hall sensor of the other the wireless audio device, and vice versa.

In one or more embodiments, the wireless audio devices include acceleration sensors. The acceleration sensors measure the acceleration of the wireless audio devices, which is used to determine whether the wireless audio devices have been tapped. When a wireless audio device is tapped a threshold number of times during a threshold length of time (e.g., 3 taps in 2 seconds), the wireless audio device initiates pairing. When two wireless audio devices are tapped together quickly enough for the right number of times, both wireless audio devices may initiate pairing and create a data connection.

Figure 1B:
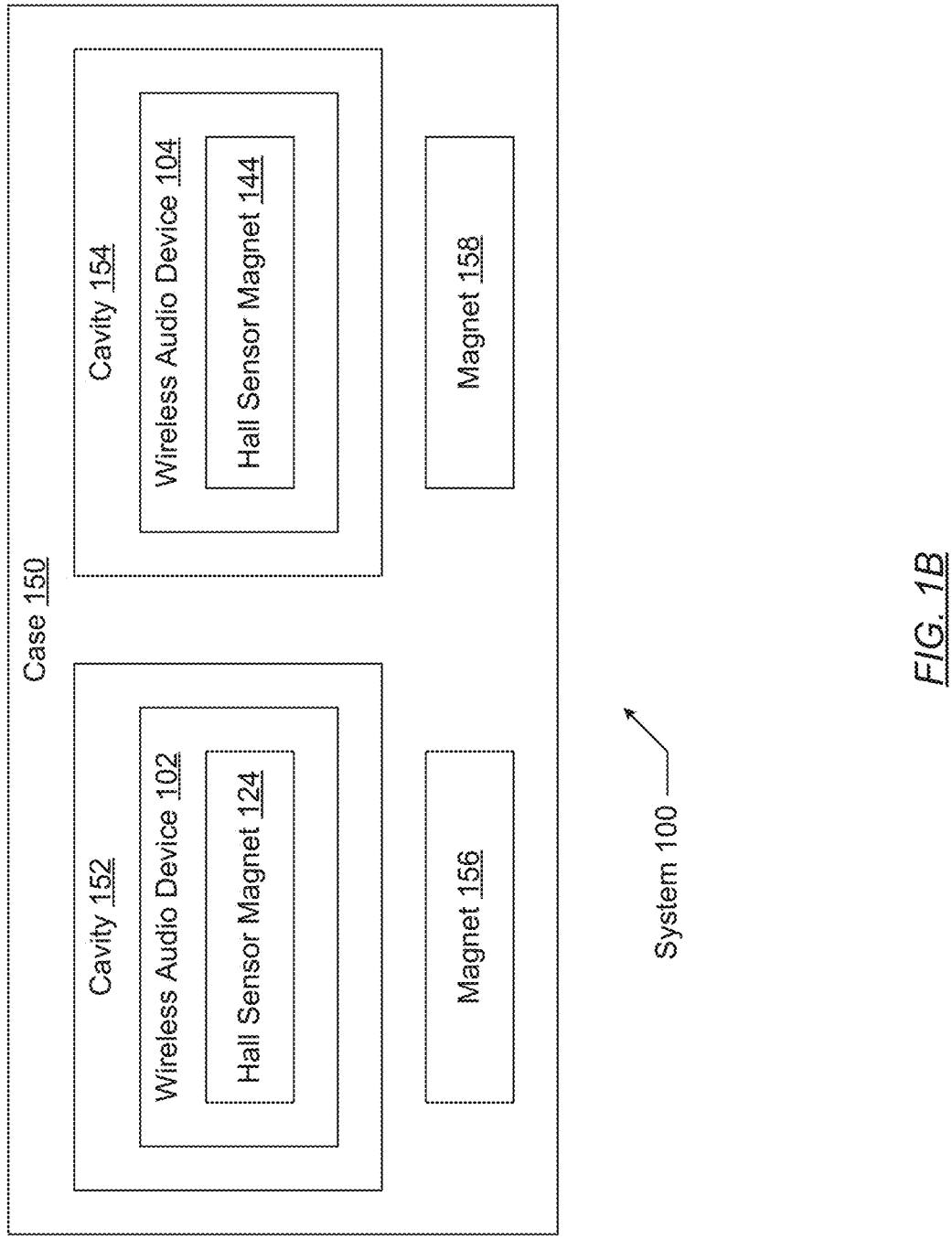
Figure 1C:
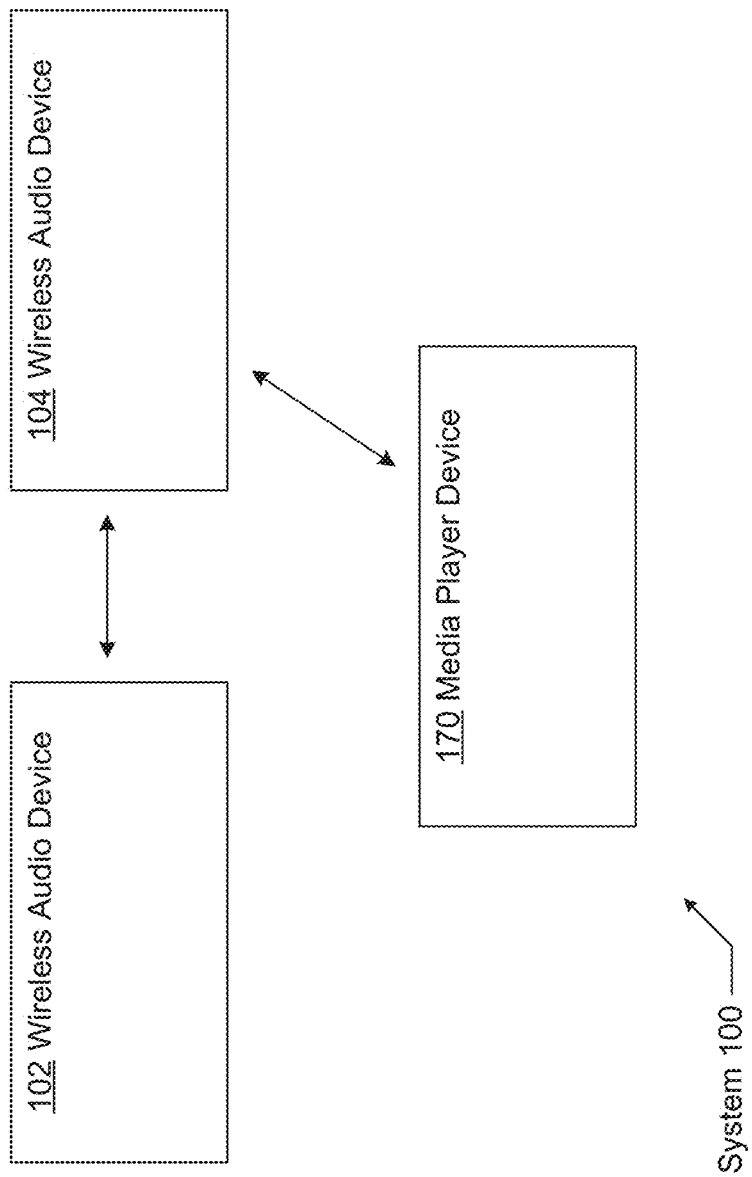

FIGS. 1A, 1B, and 1C show diagrams of one or more embodiments that are in accordance with the disclosure. The various elements, systems, and components shown in FIGS. 1A, 1B, and 1C may be omitted, repeated, combined, and/or altered as shown from FIGS. 1A, 1B, and 1C. Accordingly, the scope of the present disclosure should not be considered limited to the specific arrangements shown in FIGS. 1A, 1B, and 1C.

Referring to FIG. 1A, the system (100) provides stereo audio to a user using wireless connections, as further described below. The system (100) includes the wireless audio device (102) and the wireless audio device (104).

The wireless audio device (102) receives data wirelessly and generates audible sound waves as an audio signal that can be heard by a user wearing the wireless audio device (102). In one or more embodiments, the wireless audio device (102) is an earbud headphone with a size, shape, and configuration that fits to an ear of a user. In one or more embodiments, the wireless audio device (102) fits to the left ear of the user. The wireless audio device (102) includes the housing (106).

The housing (106) provides the shape to the wireless audio device (102) and contains the components that establish a wireless audio connection. The components of the wireless audio device (102) may include the processor (108), the memory (110), the transceiver (112), the speaker (114), the microphone (116), the antenna (118), the acceleration sensor (120), the battery (121), the Hall sensor circuit (122), and the Hall sensor magnet (124). In one or more embodiments, one or more system on chips (SoCs) include one or more of the components. For example, a Bluetooth audio SoC may include the processor (108), the memory (110), and the transceiver (112).

The processor (108) is a set of one or more processors on one or more discrete integrated circuits that operates the wireless audio device (102) by sending and receiving data to the components within the housing (106). In one or more embodiments, the processor (108) executes instructions from the memory (110) to operate the transceiver (112), the speaker (114), the microphone (116), the antenna (118), the acceleration sensor (120), and the Hall sensor circuit (122). In one or more embodiments, the set of processors that make up the processor (108) includes one or more analog to digital converters, digital to analog converters, digital signal processors, central processing units, baseband processors, etc.

The memory (110) is a set of one or more memories that store data and instructions. The data and instructions form the programs that execute and run on the processor (108). The programs are written in languages, which may include assembly language, ANSI C, C++, Python, Java, JavaScript, extensible markup language (XML), etc.

The transceiver (112) is a set of one or more transmitters and receivers that establish wireless data connections between the wireless audio device (102) and other wireless devices. In one or more embodiments, the transceiver (112) operates in accordance with the Bluetooth® low energy (BLE) specification for wireless personal area networking. Bluetooth® is a registered trademark of the Bluetooth SIG, Inc., located in Kirkland, Washington.

The speaker (114) is a set of one or more speakers in the wireless audio device (102) that converts electrical audio signals into sound that is audible to the user of the wireless audio device (102). In one or more embodiments, the speaker (114) includes one or more drivers, amplifiers, magnets, voice coils, and electroacoustic transducers that convert a digital signal from the processor (108) into audible sound.

The microphone (116) is a set of one or more microphones in the wireless audio device (102) that converts sound into an electrical signal. In one or more embodiments, the microphone (116) includes one or more amplifiers, dynamic microphones, condenser microphones, and piezoelectric microphones that convert sound waves into an electronic signal that is received by the processor (108).

The antenna (118) is a set of one or more antennas in the wireless audio device (102) that converts electrical signals back and forth to electromagnetic radio waves. In one or more embodiments, the antenna (118) includes one or more omnidirectional antennas, directional or high gain antennas, parasitic elements, parabolic reflectors, horns, etc., to direct the radio waves into beams and radiation patterns to create wireless data connections with other wireless communication devices (e.g., the wireless audio device (104) and media player device (170) of FIG. 1C).

The battery (121) is a source of electrical power used by the electrical components within the wireless audio device (102). In one or more embodiments, the battery (121) is a lithium ion rechargeable battery.

The acceleration sensor (120) measures the rate of change in the velocity of the wireless audio device (102). In one or more embodiments, the acceleration sensor (120) is a three axis accelerometer that measures acceleration using a micro electro mechanical system (MEMS) and provides a digital output using a bus protocol, such as the inter-integrated circuit (I2C) serial computer bus to the processor (108).

The Hall sensor circuit (122) is a Hall sensor that measures the presence of a magnetic field. In one or more embodiments, the Hall sensor circuit (122) is an omnipolar Hall integrated circuit that includes magnetic switches that operate to detect fields from both magnetically South poles and magnetically North poles, which trigger the output to go from a high electrical signal to a low electrical signal. In one or more embodiments, the Hall sensor circuit (122) is triggered when a threshold magnetic flux density of 5 milliteslas (mT) is detected, which corresponds with the wireless audio device (102) being within a threshold distance (e.g., about 1 millimeter) of the wireless audio device (104). In one or more embodiments, the Hall sensor circuit (122) is placed tangential to a surface of the housing.

The Hall sensor magnet (124) generates a magnetic field that may be detected by the Hall sensor circuit (142) of the wireless audio device (104). In one or more embodiments, the Hall sensor magnet (124) is a permanent magnet constricted with a size, shape, geometry, and placement within the housing (106) of the wireless audio device (102) to be sufficiently strong enough to trigger the Hall sensor circuit (142) when the wireless audio device (102) is colocated to within a threshold distance from the wireless audio device (104). Different threshold distances may be used with magnets of different sizes and field strength and with Hall sensors that have different sensitivities to magnetic fields.

In one or more embodiments, the Hall sensor circuit (122) and the Hall sensor magnet (124) are placed in complementary positions within the housing (106) of the wireless audio device (102). When the wireless audio device (102) is colocated with the wireless audio device (104) by being brought to within a threshold distance of the wireless audio device (104), the Hall sensor magnet (144) of the wireless audio device (104) will trigger the Hall sensor circuit (122) of the wireless audio device (102) and the Hall sensor magnet (124) of the wireless audio device (102) will trigger the Hall sensor circuit (142) of the wireless audio device (104). Different threshold distances may be used. For example, the threshold distance for colocation may be about 1 millimeter (mm), about 0.5 mm, about 2 mm, etc.

In one or more embodiments, a set of one or more orientations of the wireless audio device (102) with respect to the wireless audio device (104) may be used to trigger the Hall sensor circuit (122) of the wireless audio device (102)

and the Hall sensor circuit (142) of the wireless audio device (104) at about the same time or within about 0.5 seconds. In one or more embodiments, the set of one or more orientations includes a reflective orientation in which the wireless audio device (102) is brought to within one millimeter of the wireless audio device (104) and oriented with respect to the wireless audio device (104) to be a mirror image of the wireless audio device (104). An example of the reflective orientation is depicted in the FIG. 6A.

In one or more embodiments, the Hall sensor circuit (122) may be one of a plurality of Hall sensor circuits, and the Hall sensor magnet (124) may be one of a plurality of Hall magnets within the wireless audio device (102). Multiple Hall sensor circuits and magnets may increase the number of orientations that can be used to trigger at least one Hall sensor circuit on the wireless audio device (102) and at least one Hall sensor circuit on the wireless audio device (104) when the wireless audio device (102) is brought to within the threshold distance of the wireless audio device (104).

The wireless audio device (104) receives data wirelessly and generates audible sound waves as an audio signal that can be heard by a user wearing the wireless audio device (104). In one or more embodiments, the wireless audio device (104) is an earbud headphone with a size, shape, and configuration that fits to an ear of a user. In one or more embodiments, the wireless audio device (104) fits to the opposite ear (e.g., the right ear) of the user with respect to the wireless audio device (102). The wireless audio device (104) includes the housing (126).

The housing (126) provides the shape to the wireless audio device and contains the components that establish a wireless audio connection. The components of the wireless audio device (104) may include the processor (128), the memory (130), the transceiver (132), the speaker (134), the microphone (136), the antenna (138), the acceleration sensor (140), the battery (141), the Hall sensor circuit (142), and the Hall sensor magnet (144). The components within the housing (126) of the wireless audio device (104) are similar to the components within the housing (106) of the wireless audio device (102), which are described above.

Turning to FIG. 1B, the system (100) includes the case (150). The case (150) is a storage container for the wireless audio devices (102) and (104) when not in use. Additional embodiments may have the case (150) include a charging system to charge the battery (121) of wireless audio device (102) and the battery (141) of the wireless audio device (104) when the wireless audio devices (102) and (104) are present in the case (150).

The case (150) includes the cavity (152) and the magnet (156). The cavity (152) is shaped to receive and fit the wireless audio device (102). The cavity (152) may be shaped so that the other wireless audio device (104) does not fit within the cavity (152), an example of which is described with FIG. 6B below. In one or more embodiments, the magnet (156) is located within the case (150) so that placement of the wireless audio device (102) into the cavity (152) attracts the magnet (156) to the Hall sensor magnet (124) and secures the wireless audio device (102) within the case (150).

The case (150) includes the cavity (154) and the magnet (158), which are similar to the cavity (152) and the magnet (156) described above. The cavity (154) is shaped to receive and fit the wireless audio device (104) and may not fit the wireless audio device (102). In one or more embodiments, the magnet (158) attracts the Hall sensor magnet (144) when the wireless audio device (104) is placed within the cavity (154) of the case (150).

Turning to FIG. 1C, the system (100) includes the wireless audio device (102), the wireless audio device (104), and the media player device (170). The wireless audio device (102) is wirelessly connected to the wireless audio device (104), which is also wirelessly connected to the media player device (170). In one or more embodiments, data from the media player device (170) is retransmitted by the wireless audio device (104) to the wireless audio device (102). In additional embodiments, the wireless audio device (102) has a wireless connection to the media player device (170) with which to receive data from the media player device (170). When the wireless audio device (102) has a direct connection to the media player device (170), the wireless audio device (102) may also have a connection to the wireless audio device (104) to share volume settings.

The media player device (170) is any computing device (e.g., mobile device, computer system, call audio endpoint, etc.) configured to transmit audio data. The media player device (170) wirelessly transmits data that includes audio data, that is received by the wireless audio device (104), and that is received by the wireless audio device (102). The wireless audio device (104) and the wireless audio device (102) convert the audio data to audible signals that can be heard. The audio data may be from a file stored or buffered on the media player device (170) or from a stream of data received by the media player device (170).

Figure 7:
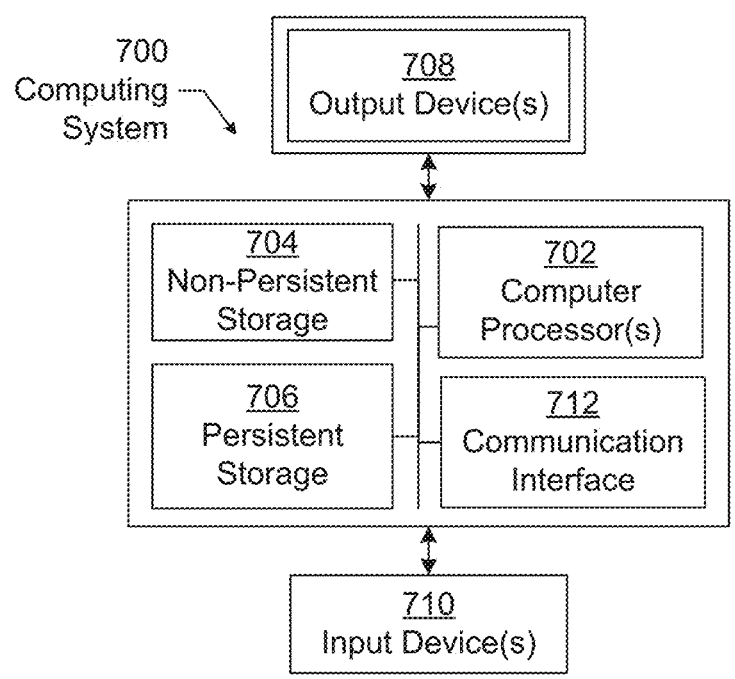
FIG. 7 shows a computing system in accordance with disclosed embodiments.

The media player device (170) and the wireless audio devices (102) and (104) are computing systems, such as the computing system (700) of FIG. 7. The wireless audio devices (102) and (104) may be embodied as a set of wireless earbud headphones and the media player device (170) may be embodied as one of a smart phone, a tablet, a desktop computer, etc.

FIGS. 2, 3, 4, and 5 show flowcharts in accordance with one or more embodiments of the disclosure. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven in accordance with one or more embodiments. By way of an example, determination steps may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

Figure 2:
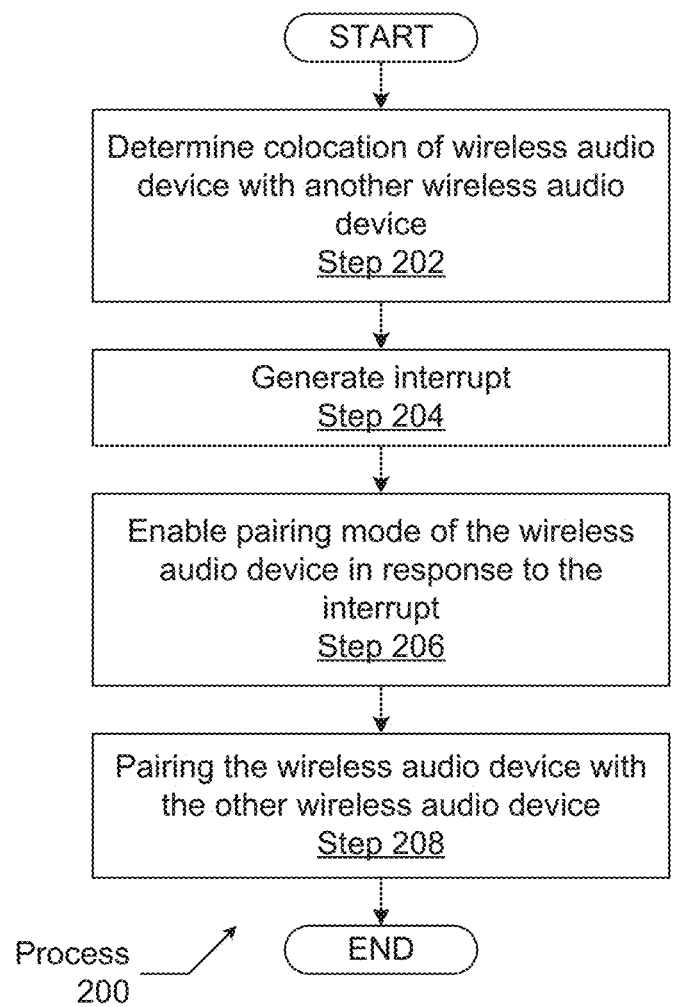
FIGS. 2, 3, 4, and 5 show a flowcharts in accordance with disclosed embodiments.

Turning to FIG. 2, FIG. 2 shows a flowchart of the process (200). The process (200) pairs wireless audio devices in accordance with one or more embodiments of the disclosure.

In Step 202, the colocation of a wireless audio device with another wireless audio device is determined. The determination is made by one or more of a processor of the wireless audio device and the sensors of the wireless audio device. In one or embodiments, the determination is performed in response to comparisons of sensor measurements to one or more thresholds. When the sensor is an accelerometer, the signal from the sensor may indicate that the wireless audio device has been tapped, the processor may determine whether the wireless audio device has been tapped a threshold number of times during a threshold length of time (e.g., 3 taps during 2 seconds), and the processor may determine that the wireless audio device is substantially colocated with the subsequent wireless audio device. When the sensor is a Hall effect sensor, the signal may indicate that the wireless audio device has detected a magnetic field that is greater than a threshold magnetic flux density (e.g., 5 mT) and the sensor may determine that the wireless audio device is within a threshold distance (e.g., 1 mm) and is substantially colocated with the subsequent wireless audio device.

In Step 204, an interrupt is generated. In one or more embodiments, the interrupt is generated in response to determining that the wireless audio device is colocated with another wireless audio device (referred to as a subsequent wireless audio device). When the wireless audio device includes an acceleration sensor and a Hall sensor, the interrupt may be generated in response to the magnetic field, measured by the Hall sensor, meeting the magnetic field threshold after the threshold number of taps and the threshold length of time are met. For example, the interrupt may be generated in response to detecting a magnetic field with a magnetic flux density of 7 mT after detecting the occurrence of 2 taps within 0.8 seconds when the magnetic flux density threshold is 6 mT, the threshold number of taps is 2, and the threshold length of time is 0.9 seconds for detecting the taps.

In Step 206, a pairing mode of the wireless audio device is enabled in response to the interrupt. In response to the interrupt after determining the colocation, the pairing mode of the wireless audio device is enabled to exchange device information between the wireless audio device and the subsequent wireless audio device so that a secure link may be established between the wireless audio device and the subsequent wireless audio device.

In Step 208, the wireless audio device is paired with the other wireless audio device. In one or more embodiments, after the pairing mode is enabled, the wireless audio device initiates and performs the paring process with the subsequent device, which is further described below.

Figure 3:
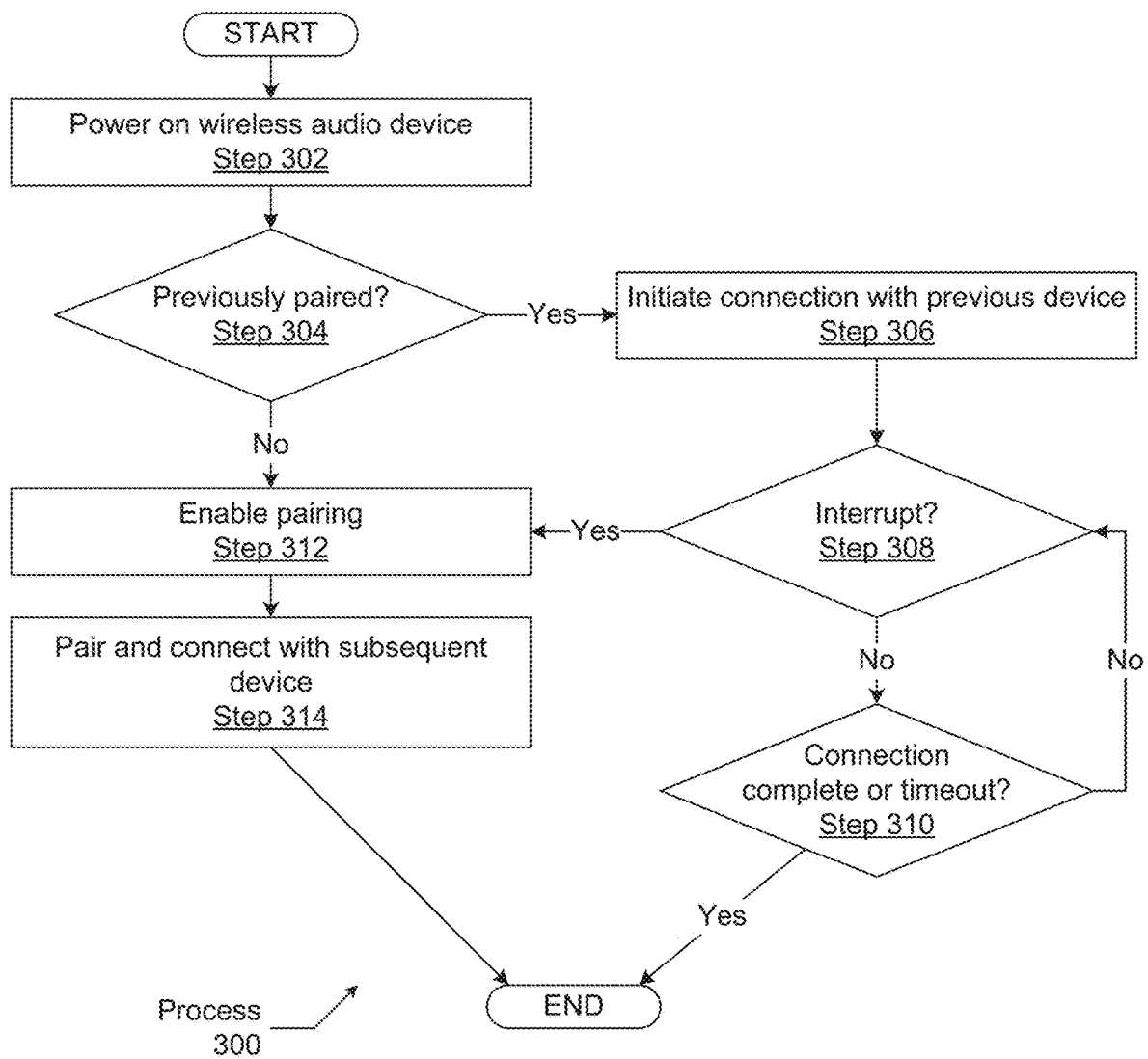

Turning to FIG. 3, FIG. 3 shows a flowchart of the process (300). In one or more embodiments, the process (300) interrupts a connection process and pairs wireless audio devices.

In Step 302, the wireless audio device is powered on. In one or more embodiments, the wireless audio device is powered on by one or more of actuating a power button of the wireless audio device and removing the wireless audio device from the case used to store the wireless audio device.

In Step 304, if the wireless audio device has been previously paired with a previous device, then the process continues to Step 306. Otherwise the process (300) continues to Step 312. In one or more embodiments, the processor of the wireless audio device determines whether the wireless audio device was previously paired by retrieving an identifier for the previous device from the memory of the wireless audio device. When the identifier is unable to be retrieved or is a null value, the determination is made that the wireless audio device was not previously paired. When the identifier is successfully retrieved and is not a null value, then the determination is made that the wireless audio device was previously paired.

In Step 306, a connection to the previous device is initiated. In one or more embodiments, after determining that the wireless audio device was paired with a previous device, the wireless audio device initiates a connection with the previous device.

In Step 308, if an interrupt is received, the initiation of the connection to the previous device is halted and the process (300) continues to Step 312. Otherwise the process (300) continues to Step 310. In one or more embodiments, the interrupt is a signal generated by a sensor of the wireless audio device that is received by the processor of the wireless audio device. In one or more embodiments, the processor may generate the interrupt after determining whether one or more thresholds have been met in order to halt the connection process or otherwise continue the connection process. In one or more embodiments, the interrupt is generated in response to comparing the magnetic field measured by a Hall sensor of the wireless audio device to a magnetic field threshold. In one or more embodiments, the interrupt is generated in response to comparing the acceleration of the wireless audio devices, as measured by an acceleration sensor, to an acceleration threshold. In one or more embodiments, the interrupt is generated in response to comparing the magnetic field to the magnetic field threshold and comparing the acceleration of the wireless audio devices to the acceleration threshold.

In Step 310, if the connection is complete or has timed out, the process (300) ends. Otherwise, the process (300) repeats back to Step 308. In one or more embodiments, completing the connection with the previous device prevents the wireless audio device from being paired with and connecting to a subsequent wireless audio device (also referred to as the subsequent device). When the connection cannot be completed, such as when the previous device is not within range of the wireless audio device, then the subsequent device may be paired with and connected to during a threshold length of time after the wireless audio device has been powered on. When the threshold length of time has been met or timed out, and the connection still has not been completed with the previous device, the process (300) ends without pairing or connecting the wireless audio device to the previous device or to the subsequent device.

In Step 312, pairing is enabled. In one or more embodiments, the pairing is enabled after the interrupt is generated by one or more of the processor and sensors of the wireless audio device in response to determining that the wireless audio device is colocated with the subsequent device.

In Step 314, the wireless audio device pairs with and connects to the subsequent device. In one or more embodiments, the pairing process includes sending a pairing request from the wireless audio device to the subsequent device; exchanging device capabilities, authentication requirements, maximum link key sizes, and bonding requirements between the wireless audio device and the subsequent device; and exchanging keys used to encrypt connections between the wireless audio device and the subsequent device. In one or more embodiments, the wireless audio device and the subsequent device establish a wireless data connection after pairing.

Figure 4:
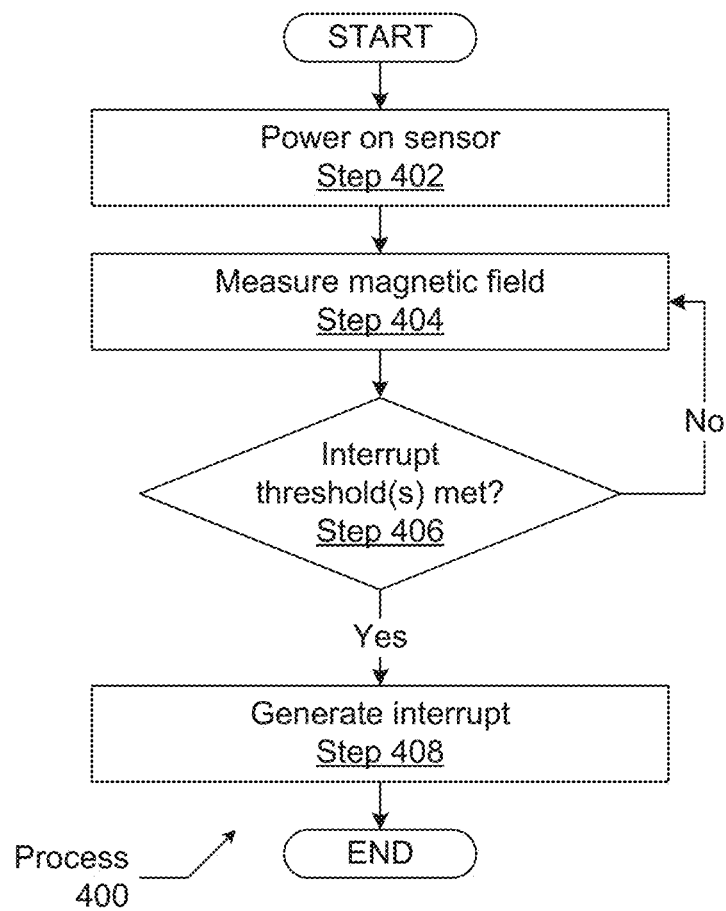

Turning to FIG. 4, FIG. 4 shows a flowchart of the process (400) in accordance with one or more embodiments of the disclosure. The process (400) generates interrupts based on magnetic fields.

In Step 402, the sensor is powered on. In one or more embodiments, the sensor is a Hall sensor of a wireless audio device. The Hall sensor incorporates components that may include Hall elements (e.g., thin strips of metal), amplifiers, comparators, and detection circuits that become active when power is applied.

In Step 404, the magnetic field is measured. In one or more embodiments, a Hall voltage is measured across the Hall elements of the Hall sensor as a current flows through the Hall elements. A magnetic field that is applied to the Hall elements changes the Hall voltage detected by the Hall sensor. The Hall voltage is proportional to the magnetic field and corresponds to the magnetic flux density of the magnetic field incident to the Hall sensor.

In Step 406, when an interrupt threshold is met, the process (400) proceeds to Step 408. Otherwise, the process (400) repeats back to Step 404 to continuously measure the strength of the magnetic fields around the wireless audio device. In one or more embodiments, the interrupt threshold is detected by comparing the magnetic field to a magnetic field threshold. In one or more embodiments, the magnetic field threshold corresponds to a magnetic field with a magnetic flux density of about 5 milliteslas (5 mT), which corresponds to the colocation of the wireless audio device to the subsequent wireless audio device by about 1 millimeter (1 mm) or less.

In Step 408, an interrupt is generated. In one or more embodiments, the Hall sensor generates the interrupt by changing the value of an output signal that is connected to a general purpose input output (GPIO) pin of a processor of the wireless audio device. In one or more embodiments, the output signal is a complementary metal oxide semiconductor (CMOS) output that changes from a high CMOS output to a low CMOS output to generate the interrupt that indicates a sufficiently strong magnetic field has been detected. In one or more embodiments, the processor receives magnetic field measurement data from the Hall sensor, compares the magnetic field measurement data to the magnetic field threshold, and generates the interrupt when the magnetic field measurement data meets the magnetic field threshold.

Figure 5:
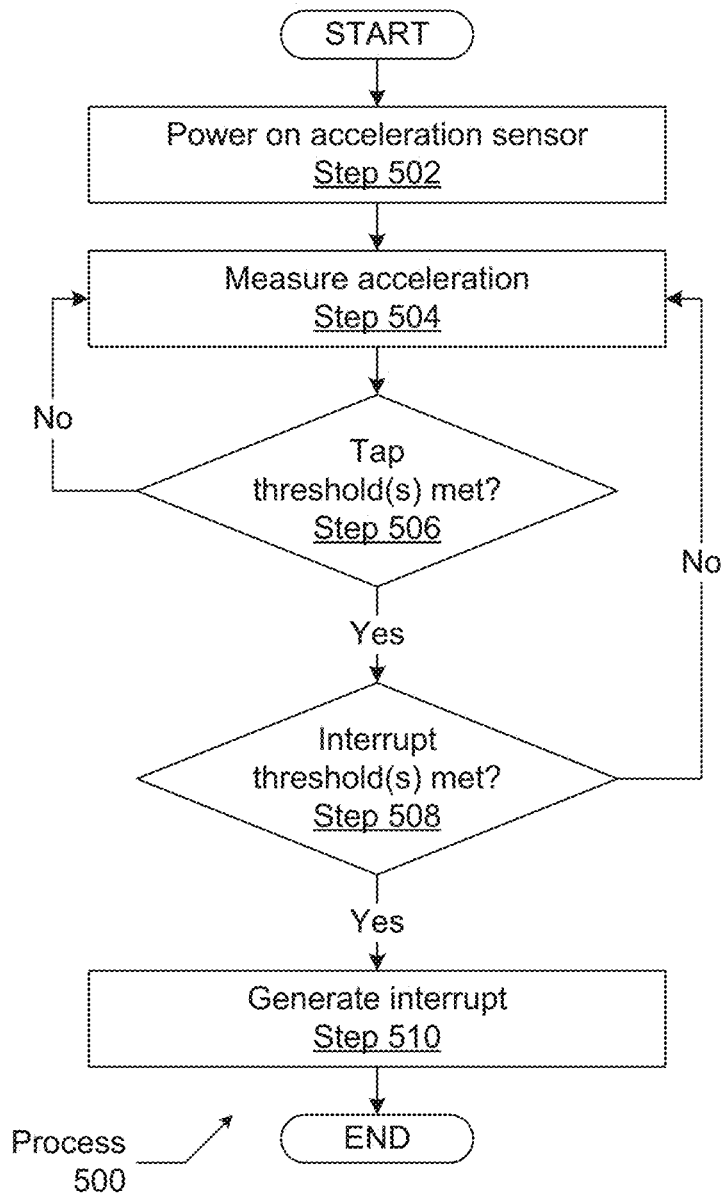

Turning to FIG. 5, FIG. 5 shows a flowchart of the process (500). The process (500) generates interrupts based on the acceleration of the wireless audio device in accordance with one or more embodiments of the disclosure.

In Step 502, the acceleration sensor is powered on. In one or more embodiments, the acceleration sensor is a MEMS digital output motion sensor of a wireless audio device. The acceleration sensor incorporates components that may include micro-electro-mechanical systems (MEMS) acceleration sensing elements, multiplexers, amplifiers, analog to digital converters, control logic, and an interfaces (e.g., an I2C serial peripheral interface (SPI)), one or more of the components of the acceleration sensor become active when power is applied.

In Step 504, acceleration is measured. In one or more embodiments, the acceleration is measured with the MEMS acceleration sensing elements by measuring the changes in the capacitance of the MEMS acceleration sensing elements that are created by imbalances in a capacitive half bridge when a mass of a MEMS acceleration sensing element is displaced by a movement of the acceleration sensor, which corresponds to movement of the wireless audio device.

In Step 506, when one or more tap thresholds are met, the process (500) proceeds to Step 508. Otherwise the process (500) repeats back to Step 504. In one or more embodiments, a single tap of the wireless audio device is identified by the acceleration sensor when the acceleration sensor measures the acceleration of the wireless audio device going above of a threshold acceleration of about 0.500 g (where one g is about 9.8 meters per second squared) and then going below the threshold acceleration within a duration threshold of about 40 milliseconds. In one or more embodiments, when the tap thresholds are met, the acceleration sensor sends a tap signal to a general purpose input output pin of the processor of the wireless audio device. In additional embodiments, the acceleration values measured by the acceleration sensor are sent to the processor of the wireless audio device and the processor determines whether the tap thresholds have been met.

In Step 508, when interrupt thresholds are met, the process (500) continues to Step 510. Otherwise the process (500) repeats back to Step 504. In one or more embodiments, a determination is made as to whether the interrupt thresholds have been met, which include a threshold number of taps and a multi tap duration threshold amount of time. For example, the threshold number of taps may be 3, the multi tap duration threshold may be 2 seconds, and the wireless audio device may determine whether 3 taps have been identified within 2 seconds to meet the interrupt thresholds. Other threshold number of taps and multi tap durations are contemplated herein without departing from the scope of the claims.

In Step 510, an interrupt is generated. In one or more embodiments, after determining that the interrupt thresholds have been met the processor of the wireless audio device generates an interrupt signal that may interrupt another program currently running on the processor.

As an example, the processor may determine that 3 taps have been received within the last 2 seconds by the wireless audio device and generate an interrupt signal to indicate that a multi tap event (e.g., 3 taps in 2 seconds) has occurred. In additional embodiments, the acceleration sensor determines that the interrupt thresholds have been met and generates an interrupt signal that is fed to a general purpose input output pin of the processor to indicate that a multi tap event (e.g., 3 taps in 2 seconds) has occurred.

Figure 6A:
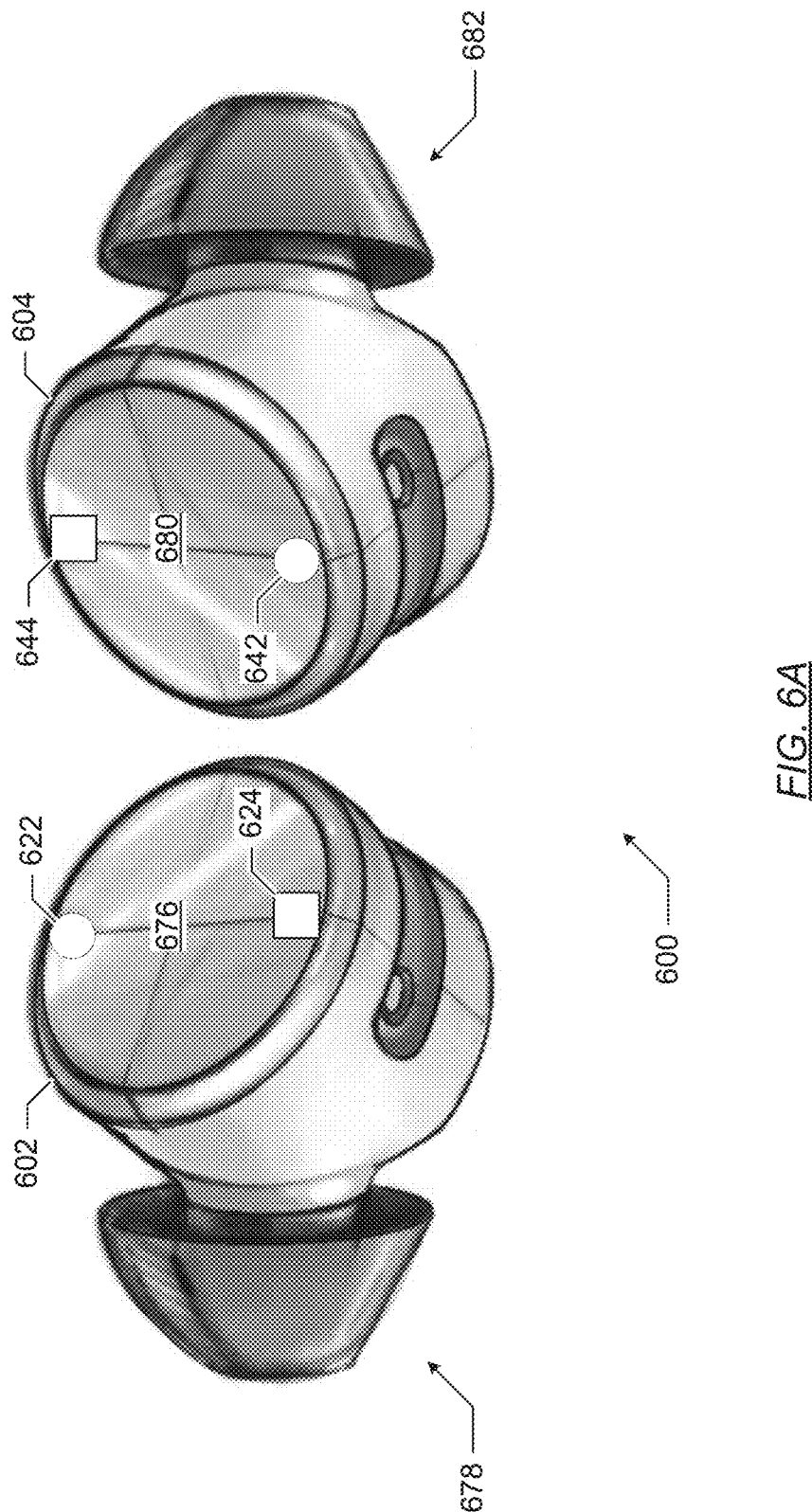
FIGS. 6A and 6B show an example in accordance with disclosed embodiments.
Figure 6B:
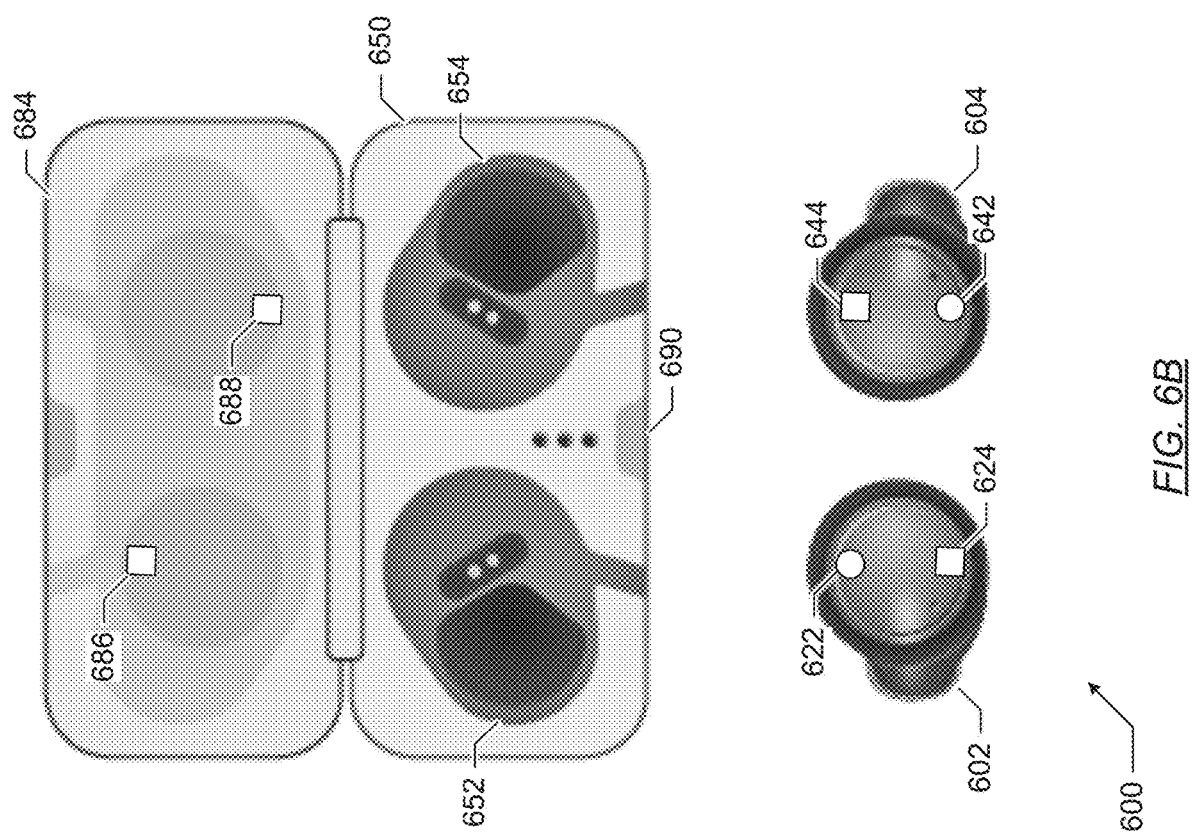

FIGS. 6A and 6B show examples of one or more embodiments that are in accordance with the disclosure. The various elements, systems, and components shown in FIGS. 6A and 6B may be omitted, repeated, combined, and/or altered as shown from 6A and 6B. Accordingly, the scope of the present disclosure should not be considered limited to the specific arrangements shown in 6A and 6B.

Referring to FIG. 6A, the system (600) includes the wireless audio device (602) and the wireless audio device (604). The wireless audio device (602) is a left audio earbud headphone and the wireless audio device (604) is a right audio earbud headphone.

The wireless audio device (602) includes the Hall sensor (622) and the Hall sensor magnet (624) at the distal end (676) of the wireless audio device (602). The Hall sensor (622) is at a top portion of the distal end (676) and the Hall sensor magnet (624) is at a bottom portion of the distal end (676). The proximal end (678) of the wireless audio device (602) is shaped and configured to be fitted to a left ear of the user.

The wireless audio device (604) includes the Hall sensor (642) and the Hall sensor magnet (644) at the distal end (680) of the wireless audio device (604). The Hall sensor (642) is at a bottom portion of the distal end (680) and the Hall sensor magnet (644) is at a top portion of the distal and (680). The proximal end (682) of the wireless audio device (604) is shaped and configured to be fitted to a right ear of the user.

The wireless audio device (602) and the wireless audio device (604) include complementary positioning of the Hall sensor (622), the Hall sensor magnet (624), the Hall sensor (642), and the Hall sensor magnet (644). With the complementary positioning of the circuits (622) and (642) with the magnets (624) and (644), when the distal ends (676) and (680) of the wireless audio devices (602) and (604) are brought together with a reflective orientation, the Hall sensor magnet (644) may trigger the Hall sensor (622) of the wireless audio device (602) and the Hall sensor magnet (624) of the wireless audio device (602) may contemporaneously trigger the Hall sensor (642) of the wireless audio device (604). The reflective orientation has both of the wireless audio devices (602) and (604) positioned right side up with the distal ends (676) and (680) pointing towards each other so that the wireless audio devices (602) and (604) appear to be mirror images. In additional embodiments, the placement of additional magnets and Hall sensors within the wireless audio devices may allow for additional orientations to trigger the Hall sensors of the wireless devices.

In one or more embodiments, when the Hall sensor (622) and the Hall sensor magnet (624) of the wireless audio device (602) are respectively brought to within a threshold distance of the Hall sensor magnet (644) and the Hall sensor (642) of the wireless audio device (604) after being powered on, then the Hall sensors (622) and (642) are triggered. In one or more embodiments, triggering the Hall sensors (622) and (642) causes the wireless audio devices (602) and (604) to pair and establish a connection. In one or more embodiments, one or more taps between the wireless audio devices (602) and (604) in combination with the triggering the Hall sensors (622) and (642) during the taps causes the wireless audio devices (602) and (604) to pair and establish a connection.

Referring to FIG. 6B, the system (600) includes the wireless audio device (602), the wireless audio device (604), and the case (650). The wireless audio device (602) is a left audio earbud headphone and the wireless audio device (604) is a right audio earbud headphone.

The case (650) includes the cavity (652) for the wireless audio device (602) and the cavity (654) for the wireless audio device (604). The case (650) includes the button (690) that releases the lid (684) in response to being activated. The lid (684) of the case (650) includes the magnets (686) and (688).

The shape of the wireless audio device (602) is left handed and includes one or more asymmetric bends, protrusions, and bulges so that the wireless audio device (602) may properly fit to a left ear of the user and may not properly fit to a right ear of the user. The cavity (652) is shaped to fit the asymmetric bends, protrusions, and bulges of the left handed wireless audio device (602) and is a left handed cavity. The wireless audio device (604) may be a right handed device with asymmetric bends, protrusions, and bulges to fit the right ear of the user and the right handed cavity (654), but not the left ear of the user and not the left handed cavity (652).

The magnet (686) is positioned within the lid (684) to match with the magnet (624) of the wireless audio device (602) and the magnet (688) is positioned within the lid (684) to match with the magnet (624) of the wireless audio device (602) when the lid (684) is closed. When the lid (684) of the case (650) is closed, the magnetic fields of the magnet (686) and the magnet (624) interact (attractively or repulsively) to secure the wireless audio device (602) within the cavity (652) of the case (650). Similarly, the magnetic fields of the magnet (688) and the magnet (644) interact to secure the wireless audio device (604) within the cavity (654) of the case (650) when the lid (684) of the case (650) is closed.

Consider the scenario in which a user purchases the wireless audio earbud headphones, such as the headphones shown in FIGS. 6A and 6B, to listen to music on public transportation to and from work. Each day, the user turns on the devices, and, because of being previously paired, the wireless earbud headphones connect to each other without an interrupt being issued to initiate pairing. One day, not realizing that the user has a hole in their pocket, the user loses one of the audio earbud headphones on the public transportation. When the user does not find the missing wireless earbud headphone, the user purchases a replacement wireless earbud headphone. Using one or more of the embodiments disclosed herein, the user may pair the existing wireless earbud headphone with the replacement wireless earbud headphone. Thus, the user may continue to listen to music with the music being passed from one headphone to the other through the connection established by the pairing process.

Embodiments may be implemented on a computing system. Any combination of mobile, desktop, embedded device, or other types of hardware may be used. For example, as shown in FIG. 7, the computing system (700) may include one or more computer processors (702), non-persistent storage (704) (e.g., volatile memory, such as random access memory (RAM), cache memory), persistent storage (706) (e.g., a flash memory), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure. The computing system (700) in FIG. 7 may be connected to or be a part of a network over which data, files, messages, streaming media, etc. may be distributed, such as a local area network, the Internet, a mobile area network, etc.

The computing system of FIG. 7, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B may compare the first element of vector A with the first element of vector B, the second element of vector A with the second element of vector B, etc. In one or more embodiments, if A and B are strings, the binary values of the strings may be compared.

The computing system of FIG. 7 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 7. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A wireless earbud headphone comprising:
a housing shaped to fit to an ear of a user;
a Hall sensor;
a processor; and
a memory, wherein the memory comprises instructions that execute on the processor and are configured for:
measuring a magnetic field generated from a subsequent wireless earbud headphone with the Hall sensor of the wireless earbud headphone;
comparing the magnetic field to a magnetic field threshold, wherein the magnetic field threshold corresponds to a colocation of the wireless earbud headphone to the subsequent wireless earbud headphone within a threshold distance;
generating an interrupt in response to the magnetic field meeting the magnetic field threshold to determine the colocation of the wireless earbud headphone with the subsequent wireless earbud headphone; and
pairing the wireless earbud headphone with the subsequent wireless earbud headphone in response to the interrupt.

2. The wireless earbud headphone of claim 1, wherein the instructions are further configured for:
powering on the wireless earbud headphone;
determining if the wireless earbud headphone was previously paired with a previous device in response to powering on the wireless earbud headphone;
performing an initiation of a connection with the previous device when the wireless earbud headphone was previously paired with the previous device;
receiving the interrupt during the initiation of the connection with the previous device;
halting the initiation of the connection to the previous device in response to receiving the interrupt; and
enabling a pairing mode of the wireless earbud headphone after halting the initiation of the connection to the previous device.

3. The wireless earbud headphone of claim 2, wherein the instructions are further configured for:
initiating a connection with the subsequent wireless earbud headphone after pairing with the subsequent wireless earbud headphone.

4. The wireless earbud headphone of claim 1, further comprising:
an acceleration sensor;
wherein the instructions are further configured for:
determining the colocation by:
measuring an acceleration of the wireless earbud headphone with the acceleration sensor;
comparing the acceleration to an acceleration threshold; and
generating the interrupt in response to the acceleration meeting the acceleration threshold.

5. The wireless earbud headphone of claim 4, wherein the instructions are further configured for:
determining the colocation by:
identifying a tap of the wireless earbud headphone in response to the acceleration meeting the acceleration threshold;
determining that the wireless earbud headphone has been tapped a threshold number of taps within a threshold length of time in response to identifying the tap; and
generating the interrupt in response to the threshold number of taps and the threshold length of time being met.

6. The wireless earbud headphone of claim 5, wherein the instructions are further configured for:
  determining the colocation by:
    generating the interrupt in response to the magnetic field satisfying the magnetic field threshold after the threshold number of taps and the threshold length of time are satisfied.

7. The wireless earbud headphone of claim 1, further comprising:
  a magnet,
  wherein the magnet is positioned within the wireless earbud headphone to trigger a subsequent Hall sensor of the subsequent wireless earbud headphone with the colocation of the wireless earbud headphone and the subsequent wireless earbud headphone, and
  wherein the magnet is positioned to secure the wireless earbud headphone to a case, which includes a corresponding magnet.

8. A system comprising:
  a wireless earbud headphone that is shaped to fit to an ear of a user and includes a Hall sensor;
  a subsequent wireless earbud headphone that is shaped to fit to another ear of the user;
  the wireless earbud headphone including a processor and memory, wherein the memory comprises instructions that execute on the processor and are configured for:
    measuring a magnetic field generated from the subsequent wireless earbud headphone with the Hall sensor of the wireless earbud headphone;
    comparing the magnetic field to a magnetic field threshold, wherein the magnetic field threshold corresponds to a colocation of the wireless earbud headphone to the subsequent wireless earbud headphone within a threshold distance;
    generating an interrupt in response to the magnetic field meeting the magnetic field threshold to determine the colocation of the wireless earbud headphone with the subsequent wireless earbud headphone; and
    pairing the wireless earbud headphone with the subsequent wireless earbud headphone in response to the interrupt.

9. The system of claim 8, wherein the instructions are further configured for:
  powering on the wireless earbud headphone;
  determining if the wireless earbud headphone was previously paired with a previous device in response to powering on the wireless earbud headphone;
  performing an initiation of a connection with the previous device when the wireless earbud headphone was previously paired with the previous device;
  receiving the interrupt during the initiation of the connection with the previous device;
  halting the initiation of the connection to the previous device in response to receiving the interrupt; and
  enabling a pairing mode of the wireless earbud headphone after halting the initiation of the connection to the previous device.

10. The system of claim 9, wherein the instructions are further configured for:
  initiating a connection with the subsequent wireless earbud headphone after pairing with the subsequent wireless earbud headphone.

11. The system of claim 8, further comprising:
  determining the colocation by:
    measuring an acceleration of the wireless earbud headphone with an acceleration sensor;
    comparing the acceleration to an acceleration threshold; and
    generating the interrupt in response to the acceleration meeting the acceleration threshold.

12. The system of claim 11, wherein the instructions are further configured for:
  determining the colocation by:
    identifying a tap of the wireless earbud headphone in response to the acceleration meeting the acceleration threshold;
    determining that the wireless earbud headphone has been tapped a threshold number of taps within a threshold length of time in response to identifying the tap; and
    generating the interrupt in response to the threshold number of taps and the threshold length of time being met.

13. The system of claim 12, wherein the threshold number of taps is three taps and the threshold length of time is two seconds.

14. The system of claim 12, wherein the instructions are further configured for:
  determining the colocation by:
    generating the interrupt in response to the magnetic field meeting the magnetic field threshold after the threshold number of taps and the threshold length of time are met.

15. A wireless earbud headphone comprising:
  a housing shaped to fit to an ear of a user;
  an acceleration sensor;
  a processor; and
  a memory, wherein the memory comprises instructions that execute on the processor and are configured for:
    measuring an acceleration of the wireless earbud headphone with the acceleration sensor;
    comparing the acceleration to an acceleration threshold; and
    generating an interrupt in response to the acceleration meeting the acceleration threshold to determine a colocation of the wireless earbud headphone with a subsequent wireless earbud headphone; and
    pairing the wireless earbud headphone with the subsequent wireless earbud headphone in response to the interrupt.

16. The wireless earbud headphone of claim 15, wherein the instructions are further configured for:
  powering on the wireless earbud headphone;
  determining if the wireless earbud headphone was previously paired with a previous device in response to powering on the wireless earbud headphone;
  performing an initiation of a connection with the previous device when the wireless earbud headphone was previously paired with the previous device;
  receiving the interrupt during the initiation of the connection with the previous device;
  halting the initiation of the connection to the previous device in response to receiving the interrupt; and
  enabling a pairing mode of the wireless earbud headphone after halting the initiation of the connection to the previous device.

17. The wireless earbud headphone of claim 16, wherein the instructions are further configured for:
  initiating a connection with the subsequent wireless earbud headphone after pairing with the subsequent wireless earbud headphone.

18. The wireless earbud headphone of claim 15, wherein the instructions are further configured for:

determining the colocation by:
: identifying a tap of the wireless earbud headphone in response to the acceleration meeting the acceleration threshold;
: determining that the wireless earbud headphone has been tapped a threshold number of taps within a threshold length of time in response to identifying the tap; and
: generating the interrupt in response to the threshold number of taps and the threshold length of time being met.

19. The wireless earbud headphone of claim 18, wherein the instructions are further configured for:
determining the colocation by:
: measuring a magnetic field with a Hall sensor of the wireless earbud headphone;
: comparing the magnetic field to a magnetic field threshold; and
: generating the interrupt in response to the magnetic field satisfying the magnetic field threshold after the threshold number of taps and the threshold length of time are satisfied.

20. The wireless earbud headphone of claim 15, further comprising:
a magnet,
wherein the magnet is positioned within the wireless earbud headphone to trigger a subsequent Hall sensor of the subsequent wireless earbud headphone with the colocation of the wireless earbud headphone and the subsequent wireless earbud headphone, and
wherein the magnet is positioned to secure the wireless earbud headphone to a case, which includes a corresponding magnet.

* * * * *